United States Patent [19]

Waters

[11] 4,262,989
[45] Apr. 21, 1981

[54] SURGICAL MICROSCOPE WITH SOLENOID DRIVEN MAGNIFICATION CHANGER

[75] Inventor: George F. Waters, Sturbridge, Mass.

[73] Assignee: Applied Fiberoptics, Southbridge, Mass.

[21] Appl. No.: 91,255

[22] Filed: Nov. 5, 1979

[51] Int. Cl.³ .............................................. G02B 7/16
[52] U.S. Cl. ...................................... 350/39; 350/254
[58] Field of Search ....................... 350/39, 254, 37, 38

[56] References Cited

U.S. PATENT DOCUMENTS 2,901,942  9/1959  Tackaberry ............................ 350/39

FOREIGN PATENT DOCUMENTS 765043   6/1934  France ........................................ 350/39
1147455  4/1969  United Kingdom ....................... 350/39

Primary Examiner—Jon W. Henry
Attorney, Agent, or Firm—Thomas N. Tarrant

[57] ABSTRACT

A stereo surgical microscope using a single large objective lens as the final lens of both optical paths and having changeable sets of galilean optics behind the objective lens for each optical path, the sets of galilean optics mounted on a rotary single shaft and arranged to provide magnification changes upon rotation of the shaft. A rotary solenoid connected to one end of the rotary shaft rotates the magnification changer for a different magnification upon each operation of a switch.

7 Claims, 2 Drawing Figures

SURGICAL MICROSCOPE WITH SOLENOID DRIVEN MAGNIFICATION CHANGER

BACKGROUND OF THE INVENTION

1. Field of the Invention

Present invention relates to stereo microscopes and in particularly to such microscopes having magnification changers.

2. Description of the Prior Art

Rotary magnification changers have been used in stereo microscopes and have commonly had a multiplicity of sets of optics mounted on a rotational shaft. The shafts have commonly been designed for manual rotation only. In surgical microscopes it has often been desirable to change the magnification at instances when the surgeon does not have a free hand to use for the purpose. Selsyn motors and step motors that could be used for rotation of a magnification changer have been tried but have not been found practical because they are too bulky, lack precision, or develop unacceptable heat.

SUMMARY OF THE INVENTION

In accordance with the present invention, a stereo microscope has sets of galilean optics in a magnification changer that is rotatable to bring the sets of galilean optics into optical alignment for expanding the object in one direction or expanding the field of view in the reverse direction. A rotary solenoid rotates the magnification changer in steps determined by the number of sets of galilean optics and whether or not a position is used for a clear unmagnified view. Each solenoid step is determined to be slightly in excess of the degrees of rotation for optics positioning. Detents pull the magnification changer back to the exact alignment position when the solenoid resets after each step.

Thus it is an object of the invention to provide a novel stereo microscope having a solenoid operated magnification changer. Further objects and features of the invention will become apparent upon reading the following description together with the drawing.

DESCRIPTION OF THE PREFERRED EMBODIMENT

Figure 1:
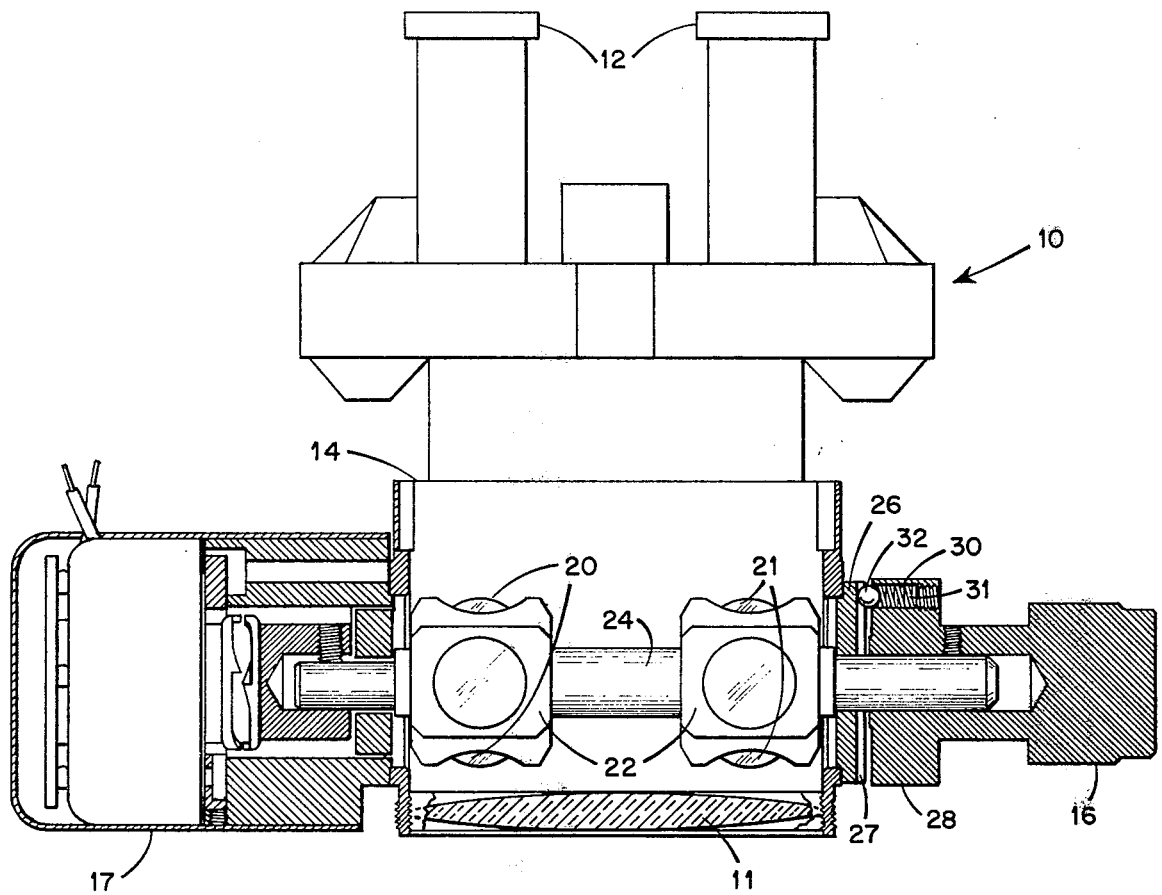
FIG. 1 is a front elevation partly in section of a microscope in accordance with the invention.
Figure 2:
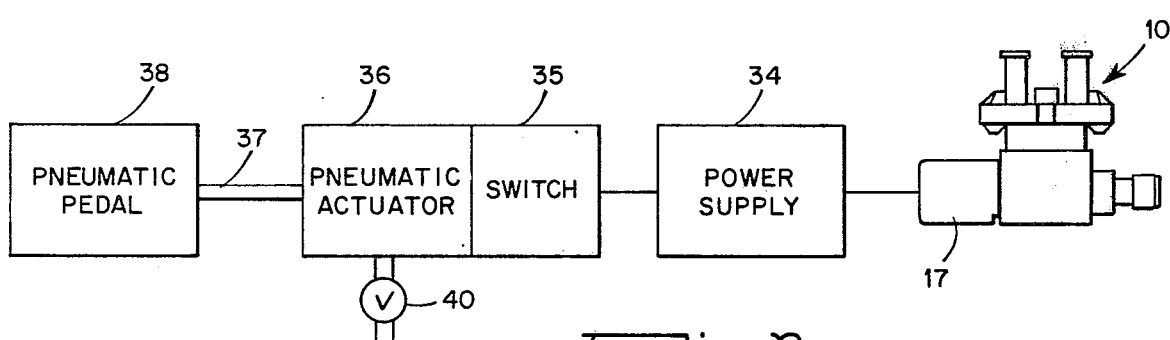
FIG. 2 is a block diagram of the stereo microscope with solenoid operated magnification changer, solenoid driver unit, and pedal operator.

Surgical microscope 10, according to the invention as depicted in FIG. 1, has a large single objective lens 11, a pair of eye pieces 12 and a cylindrical housing 14 for holding the objective lens. Magnification changer 15 is also contained inside housing 14 behind objective lens 11. A manual knob 16 on one side is for manual changing of the magnification by rotating the magnification changer. On the other side, a rotary solenoid 17 is connected for power operation of the magnification changer.

FIG. 1 shows the objective lens assembly and magnification changer in section. Magnification changer 15 has two sets of galilean optics 20 and 21 mounted in holders 22 carried on shaft 24. Shaft 24 is rotatably mounted transversely in housing 14. Holders 22 and shaft 24 are bored with apertures leaving a clear optical passage. Thus when shaft 24 is in the position depicted, each of the stereo optical paths has a gain in magnification due to optics 20 and 21. When shaft 24 is rotated 90 degrees in any direction, the clear optical paths are aligned with the stereo optical paths of the microscope and the inherent magnification of the microscope thus is obtained. A further 90 degree rotation in the same direction as before, reverses the galilean optics 20 and 21 so that the magnification is decreased from the inherent magnification of the microscope. Thus three different magnifications are available in 90 degree rotations of shaft 24. Detent plate 26 is mounted against housing 14 around shaft 24 where shaft 24 extends into knob 16. Plate 26 has two perpendicular grooves 27 in its outer surface. Knob 16 has skirt 28 facing plate 26. Skirt 28 contains a drilled hole 30 carrying a detent spring 31 and a detent ball 32. Groove 27 is V-shaped so that ball 32 seeks to center in the grooves when it encounters them. Since the grooves are perpendicular to each other across the face of plate 26, rotation of knob 16 will cause ball 32 to drop into one of the grooves at 90 degree quadrants.

Rotary solenoid 17 is mounted on shaft 24 on the opposite side of housing 14 from knob 16. Rotary solenoid 17 is a conventional type of rotary solenoid which drives a coupling in its forward direction of rotation and slips against the coupling on spring return.

For purposes of the present invention it has been found that precise positioning can be obtained by designing the solenoid to actuate in slightly greater than 90 degree segments, for example 95 degrees has been used. The amount of each rotational segment is selected to move detent ball 32 past the center of groove 27 and partly up the far wall without coming entirely out of the groove. When the rotary solenoid returns to rest, frictional slippage in the coupling provides sufficient drive to pull shaft 24 quickly back to where ball 32 centers in the bottom of groove 27. It is to be noted that rotary solenoid 17 can be connected to the end of shaft 24 interchangeably with a manual knob.

Thus when magnification changer 15 is originally provided in a microscope with two manual knobs, rotary solenoid 17 can be added in place of either knob.

Referring to FIG. 3, solenoid 17 mounted to microscope 10 is powered by connection to remote power supply 34. For safety reasons it is desirable to have only low voltages associated with the microscope so that solenoid 17 is desirably operated at a voltage lower than 30 volts. Thus power supply 34 is suitably a voltage transformer. For a direct current solenoid, power supply 34 would be a transformer, rectifier and filters for converting alternating line current to low voltage direct current.

On and off operation of the power supply is effected by sensitive switch 35, which may switch current directly or may operate a relay within power supply 34. Sensitive switch 35 is directly coupled to pneumatic actuator 36 which operates switch 35 by air pressure. Pneumatic hose 37 connects pneumatic actuator 36 to pneumatic pedal 38 for foot operation of switch 35. Valve 40 connected to actuator 36 provides a leak to outside air causing deactivation of switch 35 after a predetermined interval of time even if pedal 38 remains operated. A fixed aperture in any of the pneumatic components can be used to the same end.

It would be recognized that other fluids then air can be used for actuation and that pedal 38 can be replaced by a hand bulb or other pressure operable device.

The specifically described embodiment uses one stereo set of Galilean optics. Additional sets can be used. For example with two stereo sets of Galilean optics and still retaining the nonmagnified path, there would be six rotational positions. The six positions would use 60° detents instead of 90° detents and a 65° solenoid step could be used for the detent override.

While the invention has been described in relation to a specific embodiment, obvious alternatives are contemplated and it is the intention to cover the invention as set forth in the following claims.

I claim:

1. A surgical microscope with a power operated magnification changer comprising:
   (a) a long viewing distance stereo microscope having a single objective lens;
   (b) a magnification changer mounted on a rotary shaft behind said objective lens, said changer having optics for changing the magnification of said microscope on rotation of said shaft wherein said optics are two sets of galilean optics aligned with respective stereo paths of said microscope and leaving an open aperture aligned with said stereo paths when rotated 90 degrees;
   (c) detent elements connected to one end of said rotary shaft for precise positioning of said shaft at four 90 degree spaced positions, said detent elements comprising a plate carrying two perpendicular V grooves and a detent actuator mounted facing said plate under pressure so as to drop into said grooves when aligned;
   (d) a solenoid actuator mounted on a first end of said rotary shaft and secured to the outside of said microscope for rotating said shaft in predetermined steps; and,
   (e) a manual knob mounted on a second end of said rotary shaft.

2. A surgical microscope with a power operated magnification changer comprising:
   (a) a long viewing distance stereo microscope having a single objective lens;
   (b) a magnification changer mounted on a rotary shaft behind said objective lens, said changer having optics for changing the magnification of said microscope on rotation of said shaft wherein said optics are two sets of galilean optics aligned with respective stereo paths of said microscope and leaving an open aperture aligned with said stereo paths when rotated 90 degrees;
   (c) detent elements connected to one end of said rotary shaft for precise positioning of said shaft at four 90 degree spaced positions said detent elements comprising a plate carrying two perpendicular V grooves and a detent actuator mounted facing said plate under pressure so as to drop into said grooves when aligned; and,
   (d) a rotary solenoid actuator connected to one end of said shaft and secured to the outside of said microscope for driving said rotary shaft in steps in excess of 90 degrees, said solenoid then resetting with a frictional drag in the opposite direction of rotation assisting detent action to return said rotary shaft to its precise detented 90 degree position.

3. A surgical microscope with a power operated magnification changer comprising:
   (a) a long viewing distance stereo microscope having a single objective lens;
   (b) a magnification changer mounted on a rotary shaft behind said objective lens, said changer having optics for changing the magnification of said microscope on rotation of said shaft wherein said optics are sets of galilean optics alignable with respective stereo paths of said microscope when rotated to predetermined rotational positions;
   (c) detent elements connected to one end of said rotary shaft for precise positioning of said shaft at a plurality of spaced angular positions, said detent elements comprising a plate carrying V grooves for each of said plurality of positions and a detent actuator mounted facing said plate under pressure so as to drop into said grooves when aligned;
   (d) a solenoid actuator mounted on a first end of said rotary shaft and secured to the outside of said microscope for rotating said shaft in predetermined steps; and,
   (e) a manual knob mounted on a second end of said rotary shaft.

4. A surgical microscope with a power operated magnification changer comprising:
   (a) a long viewing distance stereo microscope having a single objective lens;
   (b) a magnification changer mounted on a rotary shaft behind said objective lens, said changer having optics for changing the magnification of said microscope on rotation of said shaft wherein said optics are sets of galilean optics alignable with respective stereo paths of said microscope when rotated to predetermined positions;
   (c) detent elements connected to one end of said rotary shaft for precise positioning of said shaft at a plurality of spaced positions said detent elements comprising a plate carrying V grooves for each of said plurality of positions and a detent actuator mounted facing said plate under pressure so as to drop into said grooves when aligned; and,
   (d) a rotary solenoid actuator mounted to said microscope coaxially with and connected to said rotary shaft for applying drive power to said rotary shaft over arcs exceeding the spacing between said V grooves, said solenoid then resetting with a frictional drag in the opposite direction of rotation assisting detent action to return said rotary shaft to its precise detented position.

5. A surgical microscope according to claim 4 wherein said solenoid actuator is controlled through a fluid control device.

6. A surgical microscope according to claim 5 wherein said fluid control device is a pneumatic pedal actuator driving a pressure sensitive electric switch.

7. A surgical microscope according to claim 5 wherein said fluid control device is a pneumatic actuator and is connected to said switch by a tubing and wherein a leak in the pneumatic system assures pressure release after a predetermined interval of time to deactuate said switch.

* * * * *